United States Patent [19]
Schuchardt

[11] Patent Number: 6,123,446
[45] Date of Patent: Sep. 26, 2000

[54] MIXING APPARATUS FOR HIGHLY VISCOUS PRODUCTS

[75] Inventor: Heinrich Schuchardt, Leverkusen, Germany

[73] Assignee: Bayer Aktiengesellschaft, Leverkusen, Germany

[21] Appl. No.: 09/438,139

[22] Filed: Nov. 10, 1999

[30] Foreign Application Priority Data

Nov. 11, 1998 [DE] Germany .......................... 198 52 065

[51] Int. Cl.⁷ ...................................................... B29B 7/48
[52] U.S. Cl. ............................. 366/97; 366/301; 366/312
[58] Field of Search .............................. 366/97, 297, 298, 366/299, 300, 301, 302, 303, 304, 325.4, 325.92, 85, 312, 309

[56] References Cited

U.S. PATENT DOCUMENTS

| | | | |
|---|---|---|---|
| 3,195,868 | 7/1965 | Loomans et al. | 366/85 |
| 4,752,135 | 6/1988 | Loomans | 366/97 |
| 4,950,081 | 8/1990 | List | 366/301 |
| 5,048,971 | 9/1991 | Wall et al. | 366/85 |
| 5,334,358 | 8/1994 | Schuchardt et al. | 366/301 |
| 5,399,012 | 3/1995 | Schuchardt et al. | 366/97 |
| 5,407,266 | 4/1995 | Dotsch et al. | 366/301 |
| 5,599,507 | 2/1997 | Shaw et al. | 422/135 |
| 5,658,075 | 8/1997 | Schebesta et al. | 366/97 |
| 5,779,986 | 7/1998 | van Endert et al. | 422/136 |

FOREIGN PATENT DOCUMENTS 197 51 730   5/1999   Germany .

*Primary Examiner*—Tony G. Soohoo
*Attorney, Agent, or Firm*—Joseph C. Gil; Noland J. Cheung

[57] ABSTRACT

The apparatus for treating viscous substances described is composed of a heatable vessel with, on one side, an inlet for the materials of the mix and, on the other side, an outlet for the materials of the mix and of two or more corotating shafts to which mixer elements have been attached, characterized in that the mixer elements are composed of two layers of bars, which are arranged crosswise in relation to each other, connected to one another. There are pins running axially attached to the face sides of the bars. These clean the interstices between the bars of the mixer elements of the adjacent shaft.

12 Claims, 16 Drawing Sheets

MIXING APPARATUS FOR HIGHLY VISCOUS PRODUCTS

FIELD OF THE INVENTION

The invention relates to an apparatus for treating highly viscous substances, composed of a heatable vessel with, on one side, an inlet for the materials of the mix and, on the other side, an outlet for the materials of the mix and of two or more corotating shafts to which mixer elements have been attached, where the mixer elements are composed of two mixer plates and two layers of bars which are arranged crosswise in relation to each other and are connected to one another. There are pins running axially attached to the face sides of the bars. These clean the interstices between the bars of the mixer elements of the adjacent shaft.

BACKGROUND OF THE INVENTION

In preparing polymers (e.g. in polycondensation reactions) some of the process steps, such as the evaporation of solvents and of monomers, are applied to viscous media.

For these process steps, which are a function of mass transfer between a liquid phase and a gas phase, the product of the interfacial area between these two phases and the mass transfer coefficient is rate-determining.

In the case of mass transfer in the viscous liquids, the mass transfer coefficient is essentially controlled by the frequency of renewal of the surfaces of the liquid.

Renewal of surfaces may in principle take place by two different mechanisms:

by spreading out the liquid at a fixed surface (e.g. described in U.S. Pat. No. 5,399,012) or by allowing liquids to flow as free liquid films (as mentioned in U.S. Pat. Nos. 5,779,986 or 5,599,507).

The creation and renewal of the liquid surfaces by producing free films here has the advantage firstly that apparatus cost remains low and secondly that little mechanical energy has to be introduced into the materials of the mix.

Good kinematic self-cleaning of the internals of the mixing apparatus is also necessary in order to avoid the formation of deposits on the internals in which, if the mixer is used as a reactor, the long residence time of the reactants favours undesirable side-reactions.

In the German patent application of file number 19751730.7 an apparatus is disclosed which is both essentially kinematically self-cleaning and, as a result of film formation, also continuously produces renewed liquid surfaces for mass transfer to and from a gas phase.

Both in degassing procedures and in polymerizations there is frequently a rise in viscosity within a mixer by a factor of more than 10. A mixer which utilizes free-falling films to create and renew liquid surfaces cannot operate ideally unless the shape of the mixer elements is varied along the length.

To this end, in U.S. Pat. No. 5,599,507 variations are made, along the length of the apparatus in some or all of:

the distance between the mixer elements, free cross section of the mixer elements, the diameter of the openings in the mixer elements, the size of the openings in the overflow weirs.

In the German Patent Application of file number 19751730.7 the plate width and the sizes of the openings in the discs can be varied along the length, but not the number of openings per plate.

SUMMARY OF THE INVENTION

It is an object of the present invention to create an apparatus which, through film formation, creates liquid surfaces for mass transfer to and from a gas phase and is both kinematically self-cleaning and allows geometrical parameters to be changed along the length of the apparatus within a large parameter range.

According to the invention, this object is achieved by means of a mixing apparatus provided by the invention and composed at least of a heatable vessel with an inlet for the materials of the mix, an outlet for the materials of the mix and two or more shafts as rotating internals within the vessels to which connected to a drive for corotation of the shafts, where there are mixer elements attached to the shafts, characterized in that the mixer elements are composed of two mixer plates and two layers of bars which are arranged crosswise in relation to each other and are connected to one another. The two layers of bars are displaced in relation to each other around the axis of the shaft in such a manner that, when projected in the longitudinal direction of the shaft, the projections of the bars cross each other. There are also pins running axially attached to the face sides of the mixer elements, where the pins of a shaft clean the interstices between the bars of the mixer elements of the respective other shaft during the rotation of the shafts.

DETAILED DESCRIPTION OF THE DRAWINGS

Figure 1A:
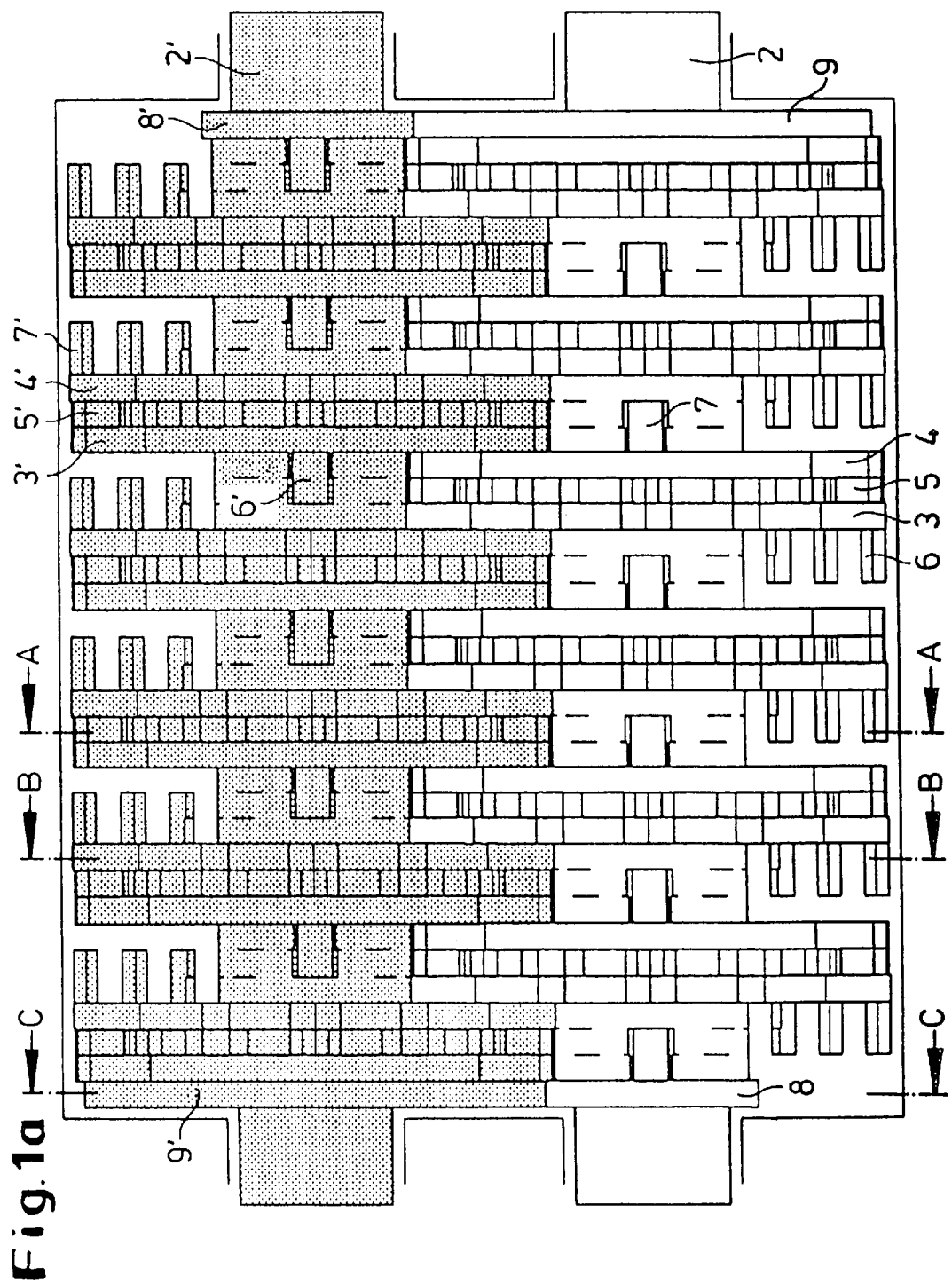
FIG. 1a shows a diagrammatic plan view of the structure of a novel apparatus. The casing is shown only diagrammatically, and opened.

This arrangement according to the invention permits complete kinematic clean-off of the mixing-material-contacted parts of the internals and, where appropriate, of the casing of the apparatus:

On the face side turned outward relative to the mixer element the bars are cleaned by bars of the mixer elements of the intermeshing shaft. The face sides turned inward are cleaned by the pins of the intermeshing shaft.

The shafts are cleaned by bars and pins.

The pins are cleaned by the bars. The perimeter of the casing is cleaned by pins and bars.

If additional end plates are provided at, seen from an axial direction, the ends of the shafts, these can clean the face side of the casing.

A preferred apparatus is characterized in that the pins are attached to the face sides of the bars.

In a preferred embodiment, the connection between crossed layers of bars of a mixer element is not direct but via a layer of connector elements running axially.

A particular embodiment of the apparatus is constructed so that the shafts with mixer elements have been subdivided into at least two areas in which the mixer elements have a different number of bars.

In a particularly preferred embodiment of the apparatus, the number of the bars of each mixer element is higher in the area of the inlet for the materials of the mix than in the area of the outlet for the materials of the mix.

With this there is a change, for example, along the length of the apparatus in the number of the bars per layer, so that in areas with high viscosity of the materials of the mix, depending on the process carried out in the apparatus, in particular toward the outlet, the number of the bars becomes small, and as a result the mixing process becomes more uniform. Due to the higher viscosity of the materials of the mix the product films on the surfaces are thicker in this region so that larger elements are required for transfer processes.

A preferred version of the apparatus is characterized in that, on the shafts, the transition between the areas with mixer elements with a different number of bars is formed by mixer elements which have two layers with a different number of crossed bars.

In another version of the mixing apparatus, the shafts with mixer elements have been subdivided into at least two areas in which, seen in the direction of the shaft axis, the mixer elements have interstices of different widths between the bars.

In a particularly preferred apparatus, the width of the interstices between the bars of each mixer element is smaller in the area of the inlet for the materials of the mix than in the area of the outlet for the materials of the mix.

In this embodiment, the width of the gaps between the bars of a layer changes along the length of the apparatus, so that in areas with a high viscosity of the materials of the mix in the process carried out the gaps become large. Liquid films of high viscosity are stable over greater heights of fall. Due to their viscosity they thin more slowly over the height of fall than liquid films of lower viscosity.

A preferred version of the embodiment mentioned of the apparatus is constructed so that, on the shafts, the transition between the areas with mixer elements with a different width of the interstices between the bars is formed by mixer elements which have two crossed layers of bars with different interstices.

In another preferred embodiment of the apparatus, the drive is constructed for equal-speed rotation of adjacent shafts.

Another preferred version of the mixing apparatus is characterized in that the dimension of the mixer elements, seen in the direction along the shaft axis, is smaller in the area of the inlet for the materials of the mix than in the area of the outlet for the materials of the mix.

In this embodiment, the axial dimension of the mixer elements changes along the length of the apparatus, so that in areas with high viscosity, e.g. in the area of the outlet, the axial dimension of the individual mixer elements becomes large. Where the viscosity of the materials of the mix is high the product films are thicker so that more axial space is required.

In a particularly preferred embodiment of the apparatus, the different axial dimensions of the mixer elements are brought about by connector elements of different dimension, seen in the axial direction.

To obtain a larger heating surface, the shafts, or else also the bars, pins and connector elements, may be heated, as well as the casing.

The invention is described in more detail below by way of example using the figures. This does not place limitations of detail on the invention.

Figure 1B:
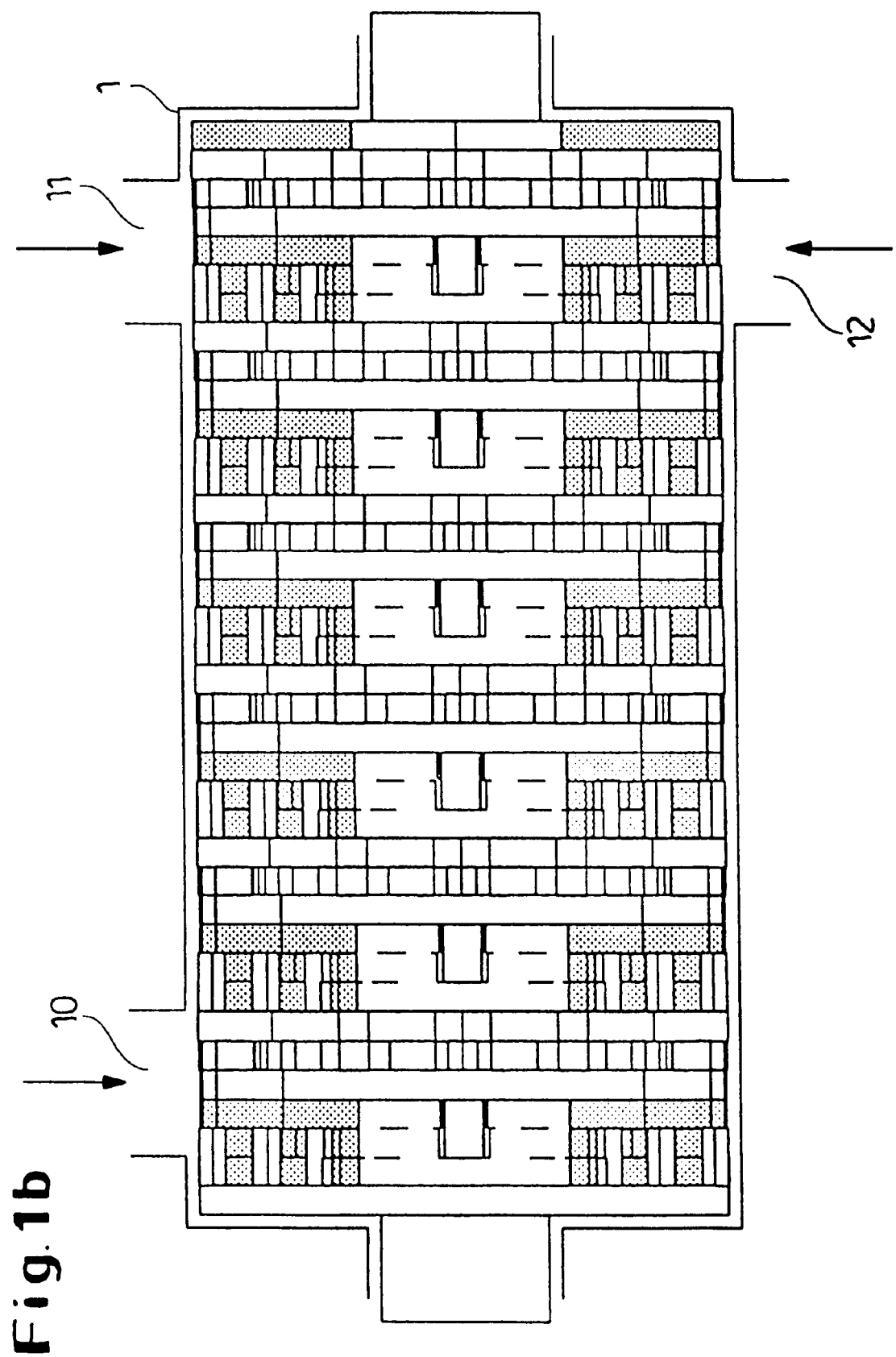
FIG. 1b shows the structure of the apparatus of FIG. 1a in a side view.
Figure 1C:
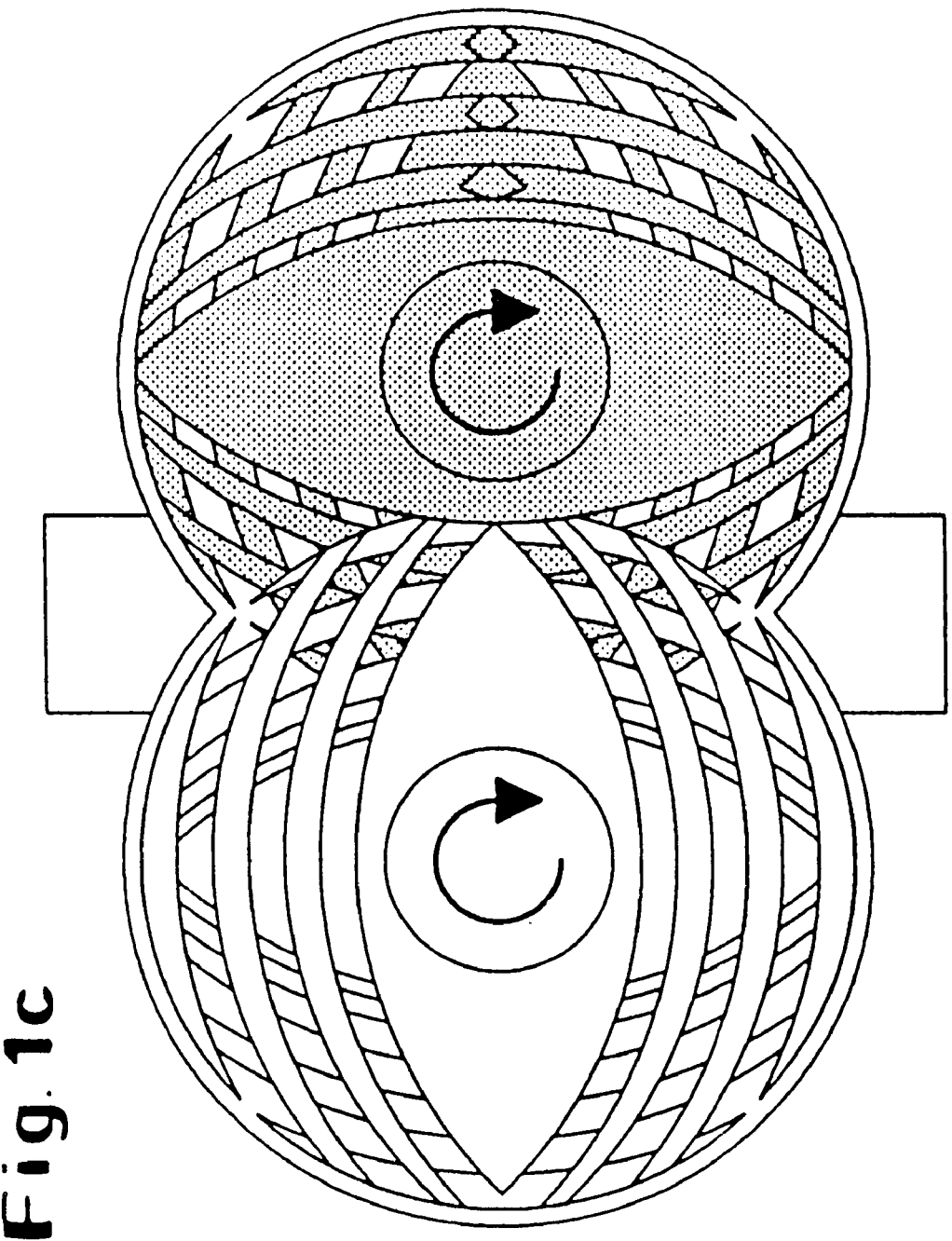
FIG. 1c shows the structure of the apparatus of FIG. 1a in a sectional view along line A—A.

FIGS. 1a–1c shows the overall structure of the apparatus. FIG. 1a shows the plan view and FIG. 1b the side view, and FIG. 1c the front view.

The heated casing 1 which is indicated only diagrammatically has a product inlet 10, a product outlet 12 and a vapour connection 11.

In the casing 1 are arranged two parallel, corotating shafts 2 and 2' which rotate at the same speed. At different axial positions on these are mixer elements 13 and 13'. Each of these is composed of two mixer plates 15 and two layers of sickle-shaped bars 3 and 4 or, respectively, 3' and 4', which are arranged crosswise in relation to each other and are connected to one another by connector elements 5 or, respectively, 5' running axially. On the bars 3 and 4 or, respectively, 3' and 4', centrally arranged on the face sides, there are pins 6 and 7, or, respectively, 6' and 7', which, during the rotation of the shafts 2 and 2', clean the gaps between the bars 3' and 4' or, respectively, 4 and 3 and between the connector elements 5' or, respectively, 5 of the mixer elements of the other shaft.

Along the entire length of the mixer the number of pins on one diameter is 6. All of the mixer elements in this embodiment have the same structure.

In an axial direction there are end plates 8 and 9 or, respectively, 8' and 9' attached at the ends, and these clean the face sides of the casing. The end plates 9 and 9' also carry pins. These pins clean the mixer elements located at the ends.

Figure 2:
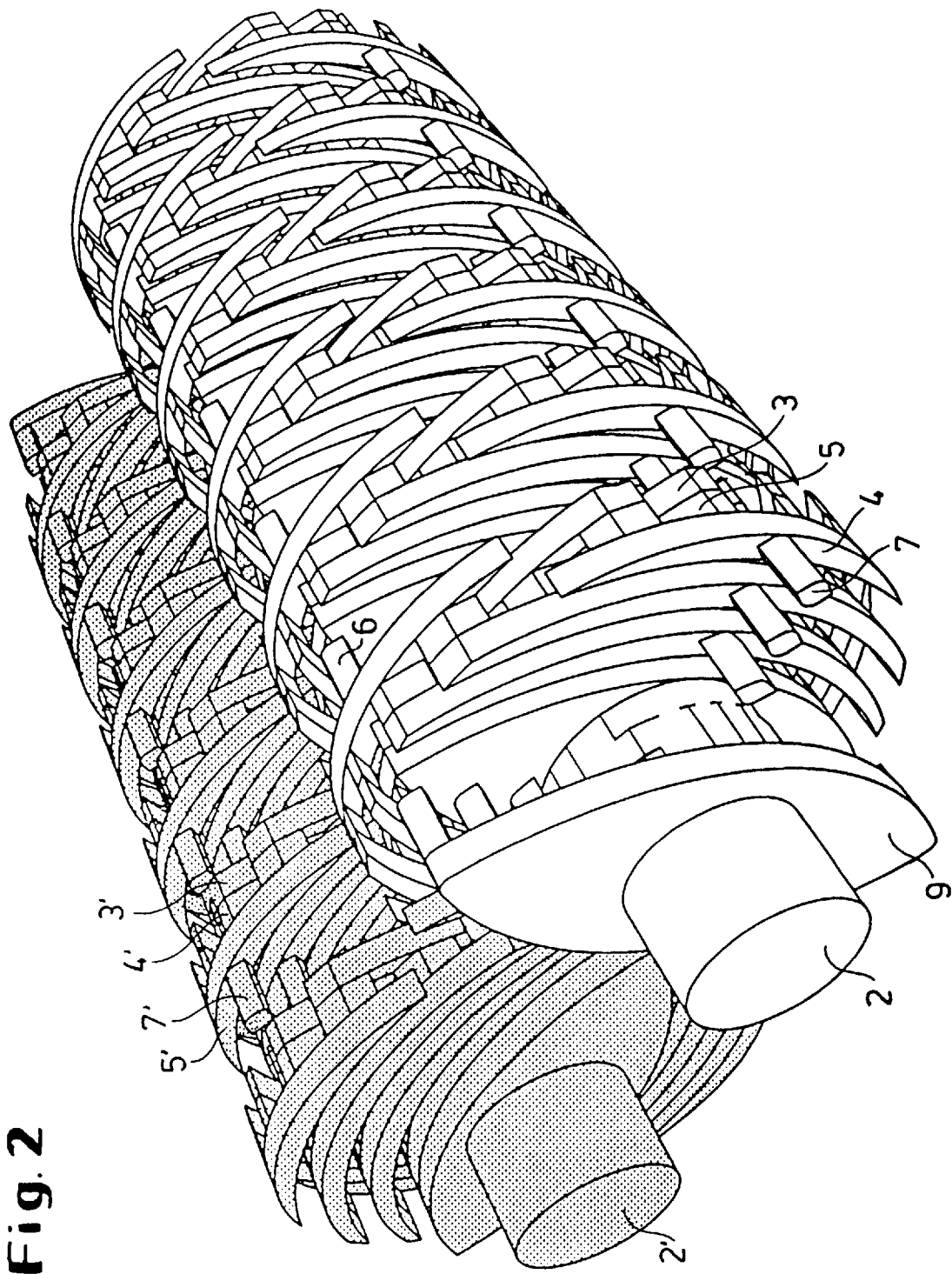
FIG. 2 shows a perspective view of the shafts and mixer elements of the apparatus of FIGS. 1a–1c.

FIG. 2 shows the rotors in perspective.

Figure 3A:
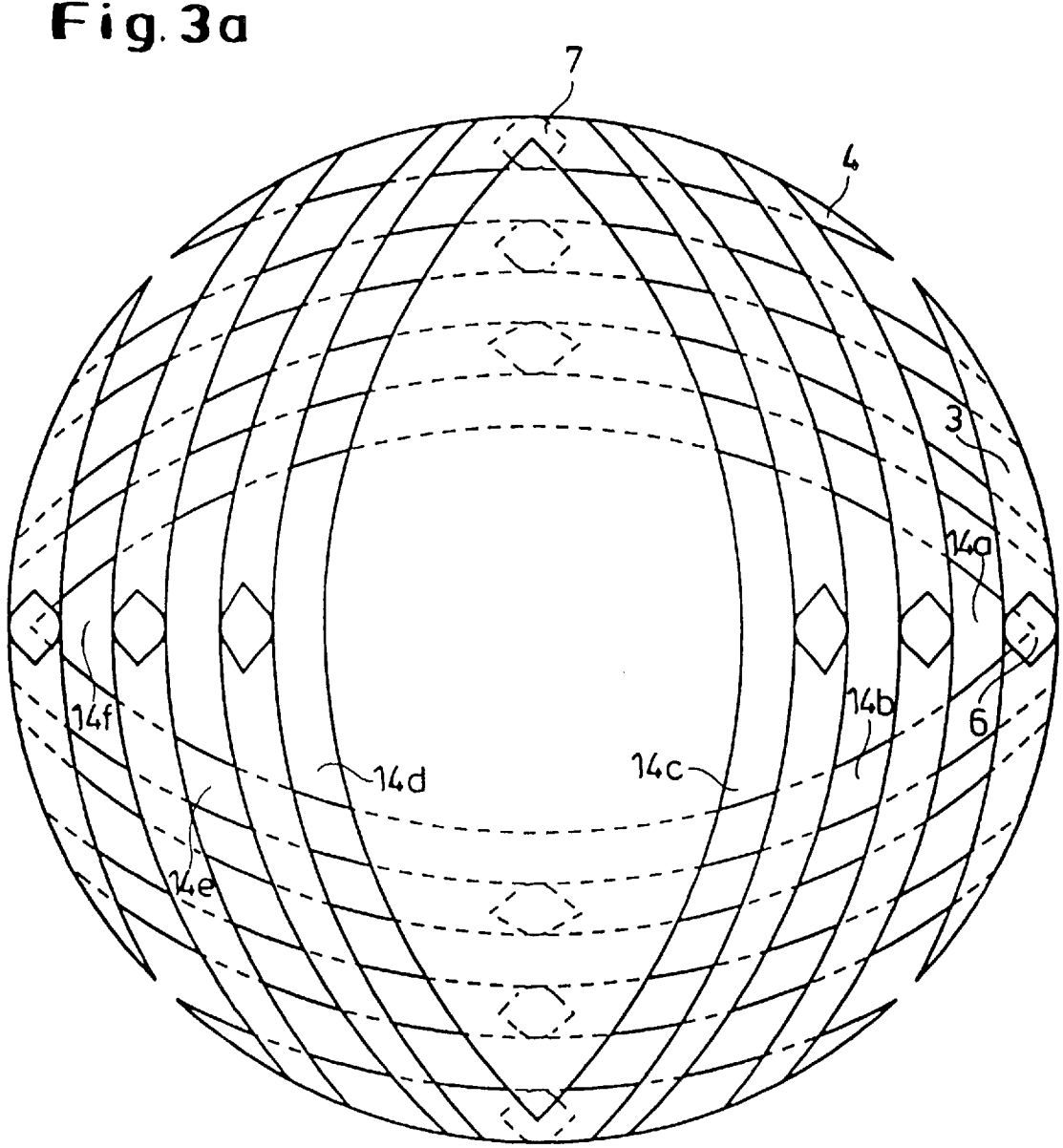
FIG. 3a shows a plan view of the structure of an individual mixer element of the apparatus of FIGS. 1a–1c.
Figure 3B:
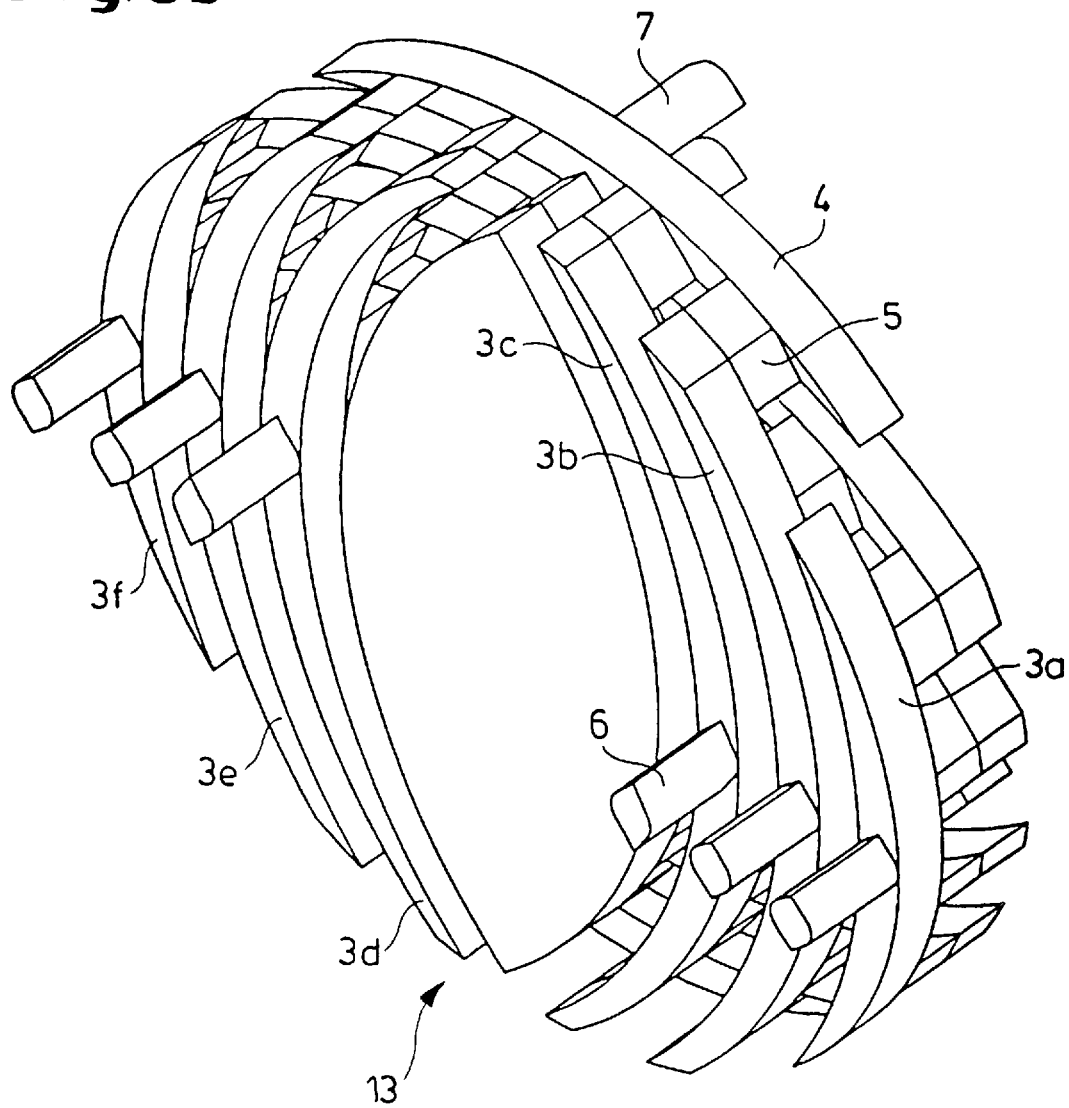
FIG. 3b shows another plan view of the structure of an individual mixer element of the apparatus of FIGS. 1a–1c.

An individual mixer element is shown in front view in FIG. 3a and in perspective view in FIG. 3b.

Figure 4:
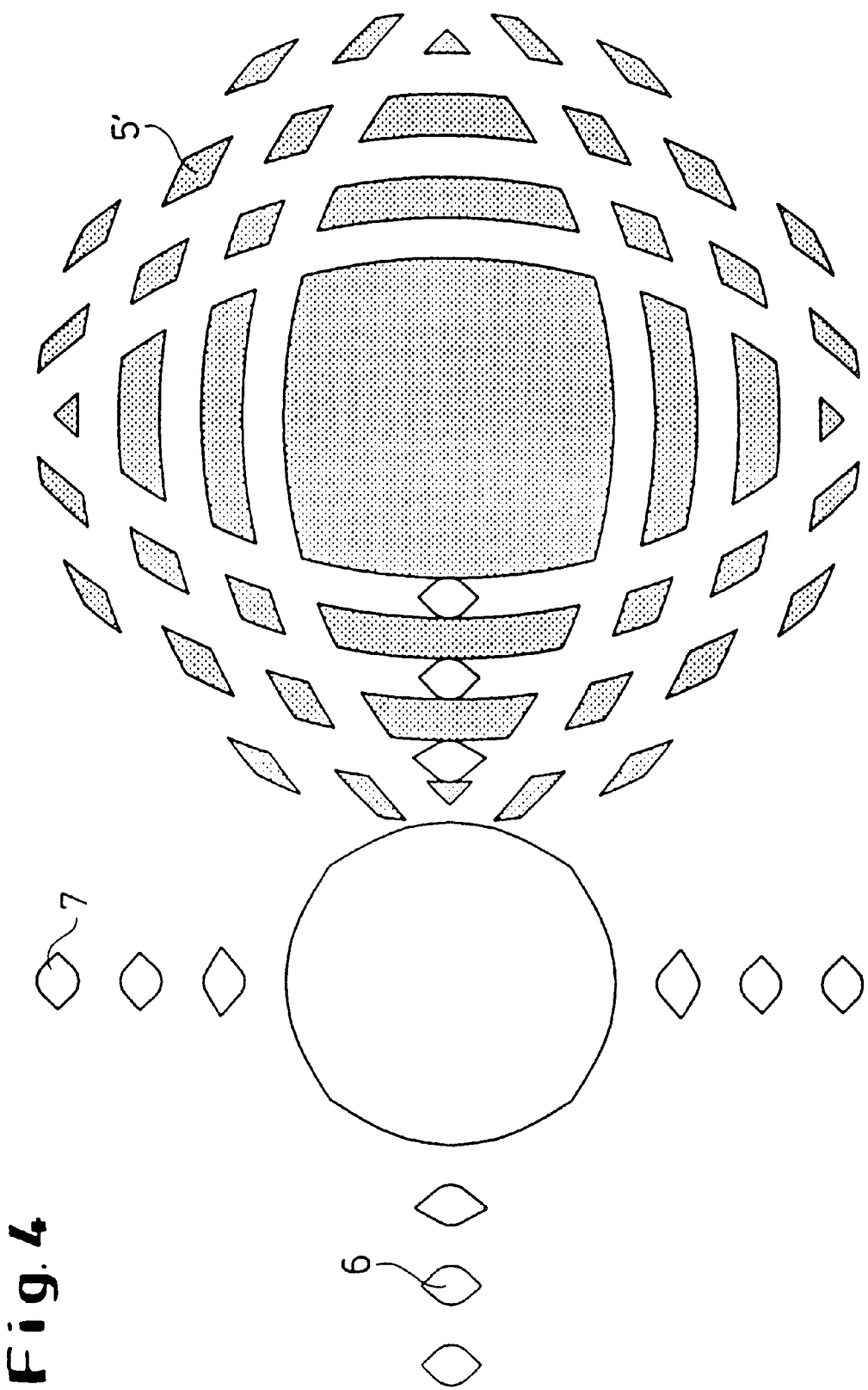
FIG. 4 shows a radial section through the connector elements' and the intermeshing pins 6 and 7 from FIGS 1a–1c.

FIG. 4 shows a section through the connector elements 5' and the intermeshing pins 6 and 7.

Figure 5:
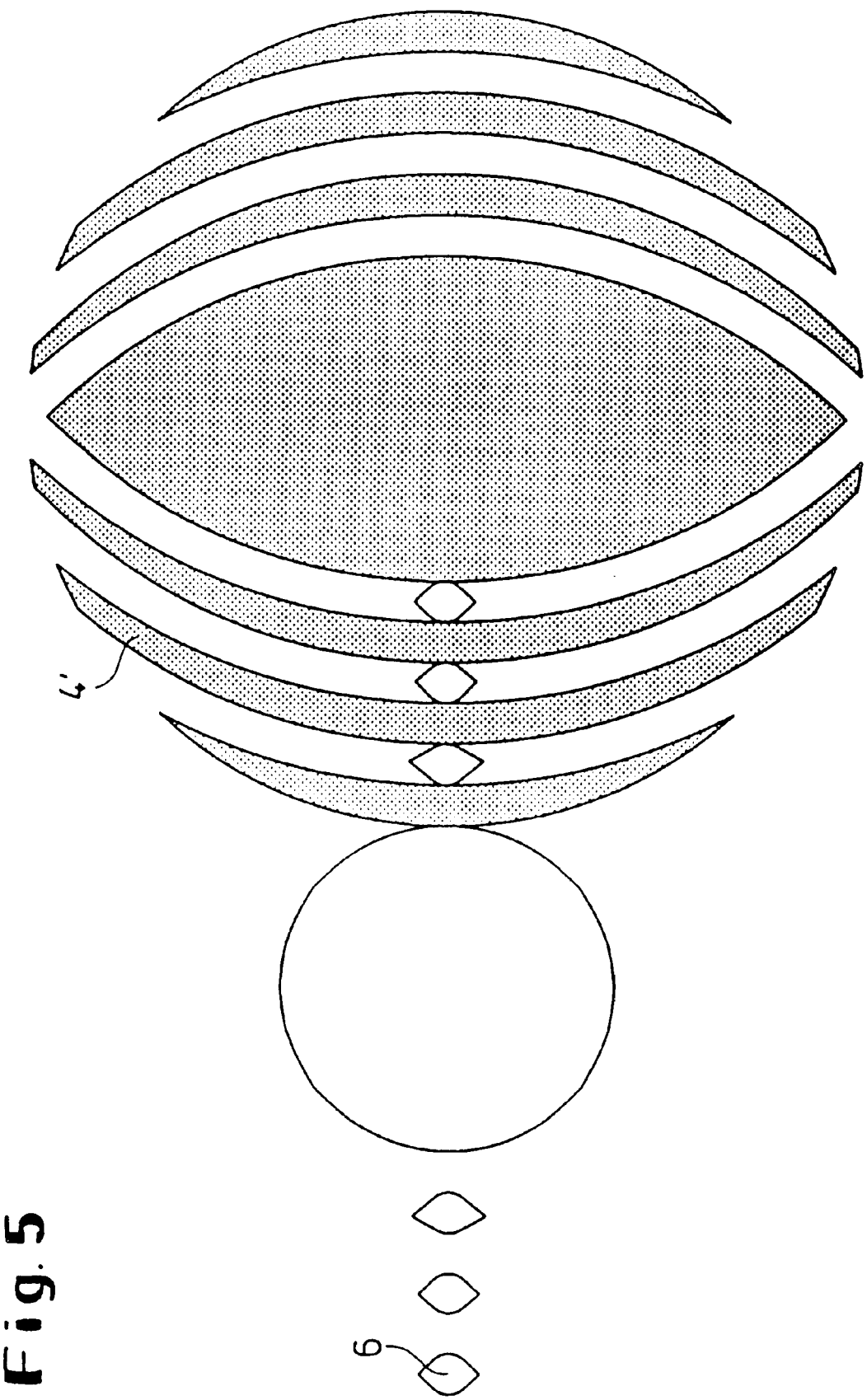
FIG. 5 shows a radial section through the layer of bars 4' and the intermeshing pins 6 from FIGS. 1a–1c.

FIG. 5 shows a radial section through the layer of bars 4' and the intermeshing pins 6.

Figure 6:
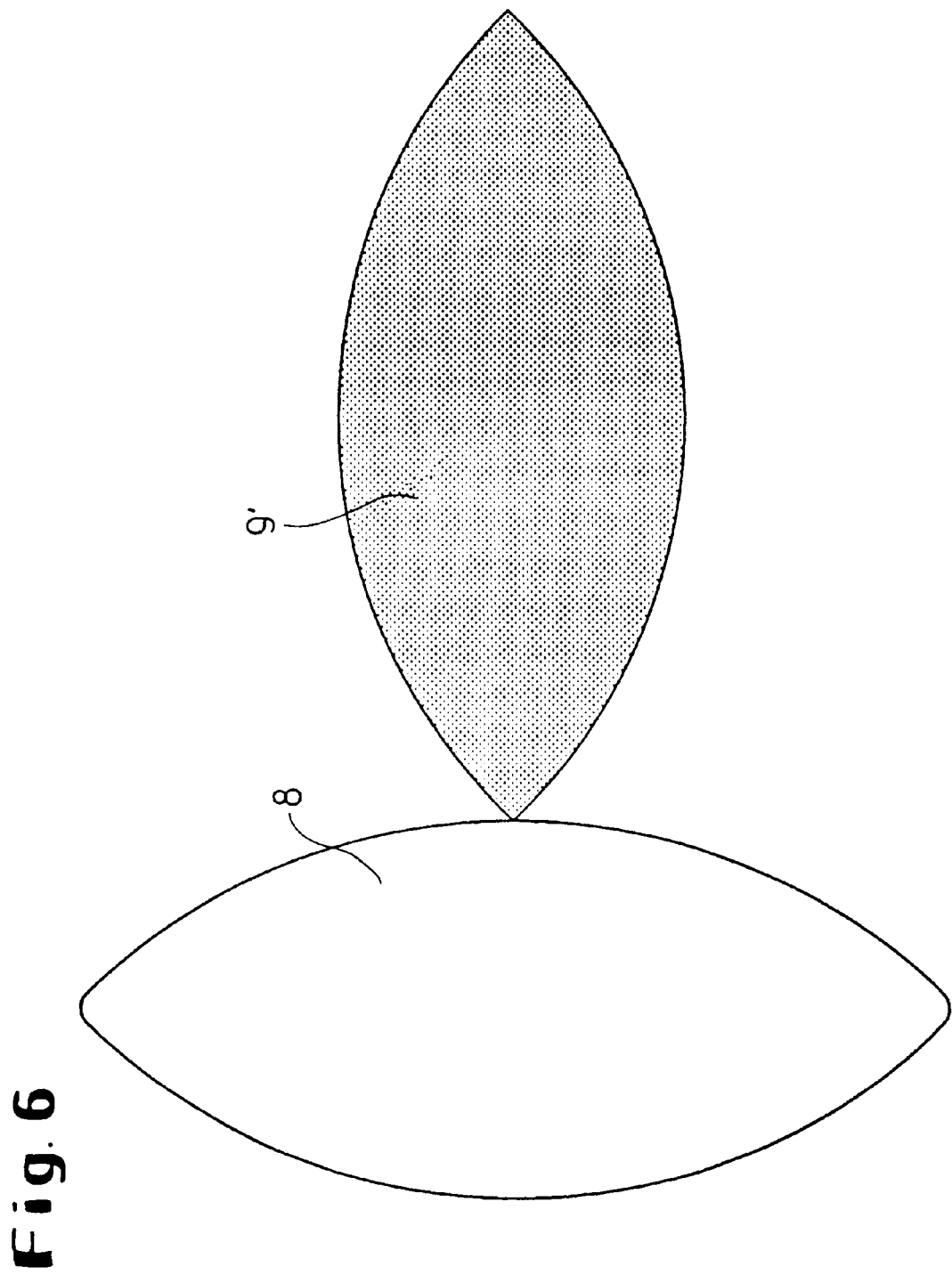
FIG. 6 shows a radial section through the end plates 8 and 9' from FIGS. 1a–1c.

FIG. 6 shows a radial section through the end plates 8 and 9'.

In another embodiment of the apparatus the number of bars per layer is varied along the length of the apparatus so that in areas with high viscosities in the process carried out, generally towards the discharge, the number of bars becomes small.

Figure 7A:
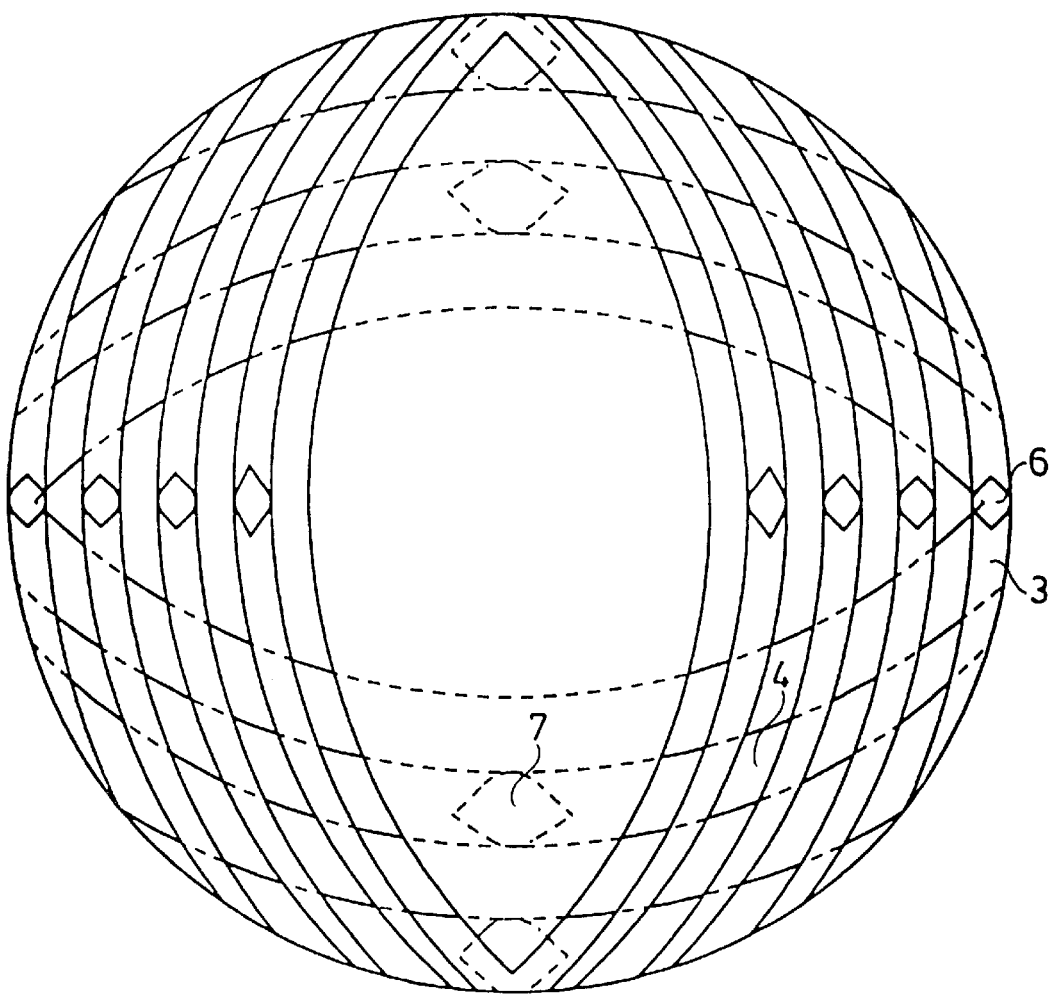
FIG. 7a shows view of a mixer element.
Figure 7B:
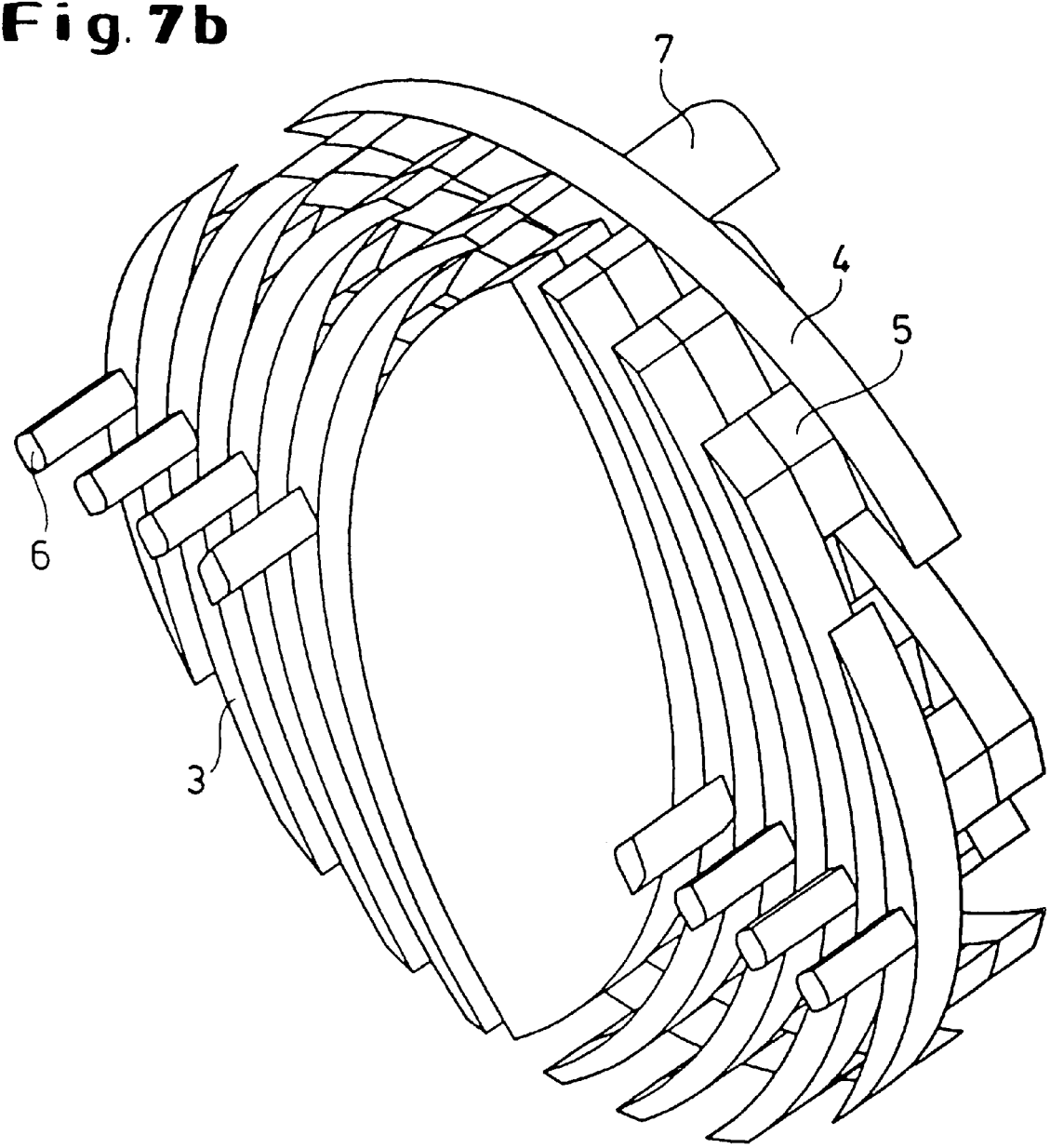
FIG. 7b shows another view of a mixer element.
Figure 8A:
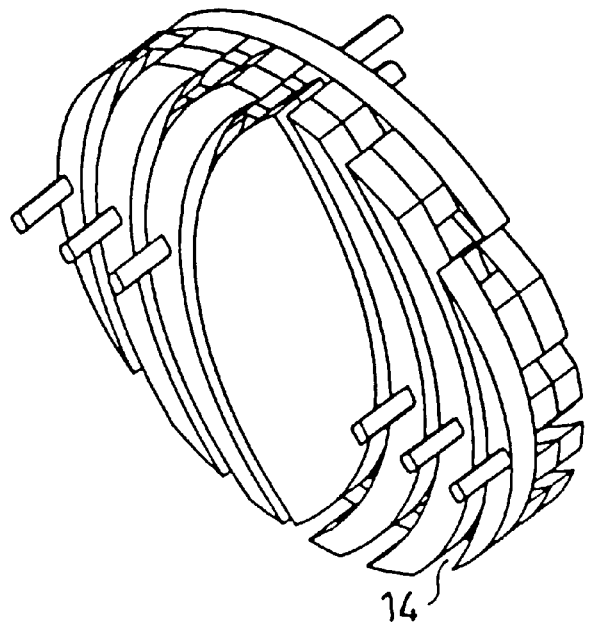
FIGS. 8a–8d show a plurality of mixer elements in which the distance in the bar increases.
Figure 8B:
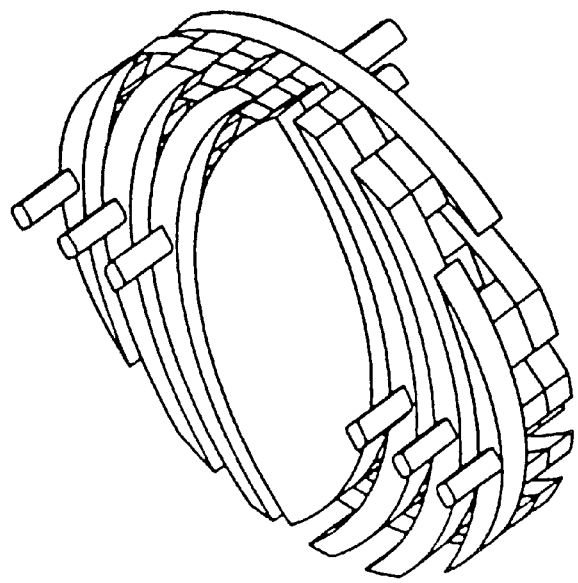
Figure 8C:
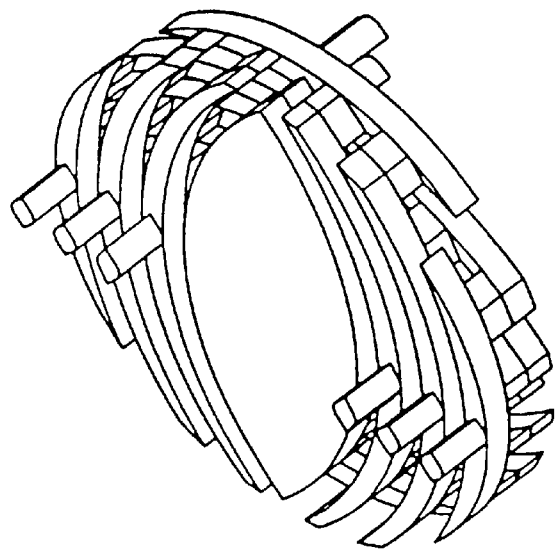
Figure 8D:
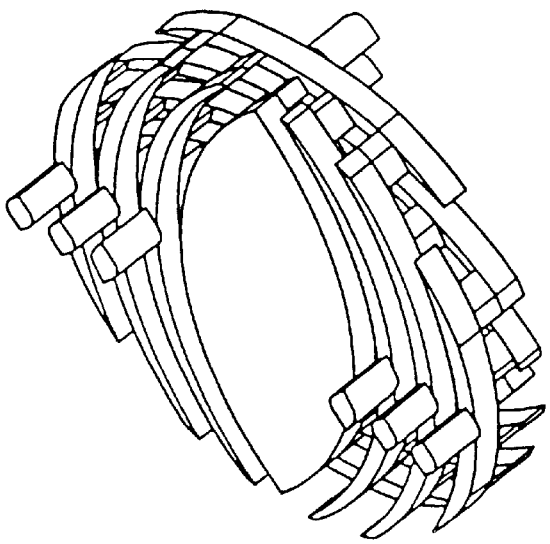
Figure 9A:
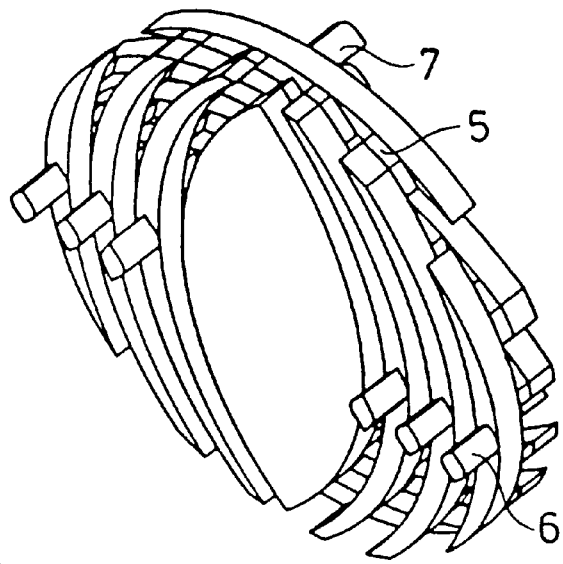
FIGS. 9a–9d show a plurality of mixer elements in which the axial dimension of the connector elements increases.
Figure 9B:
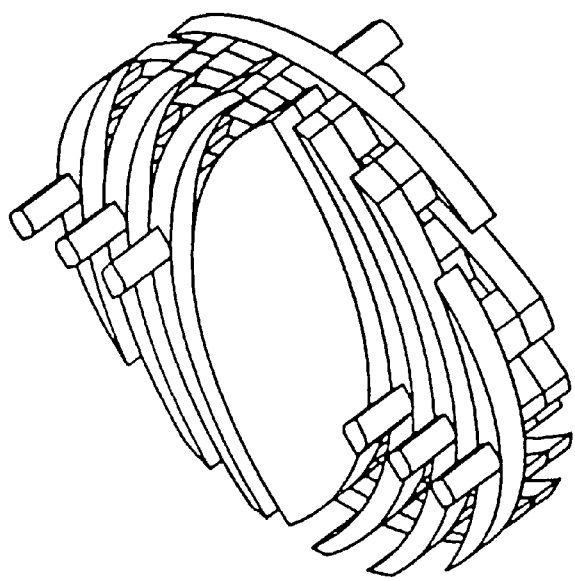
Figure 9C:
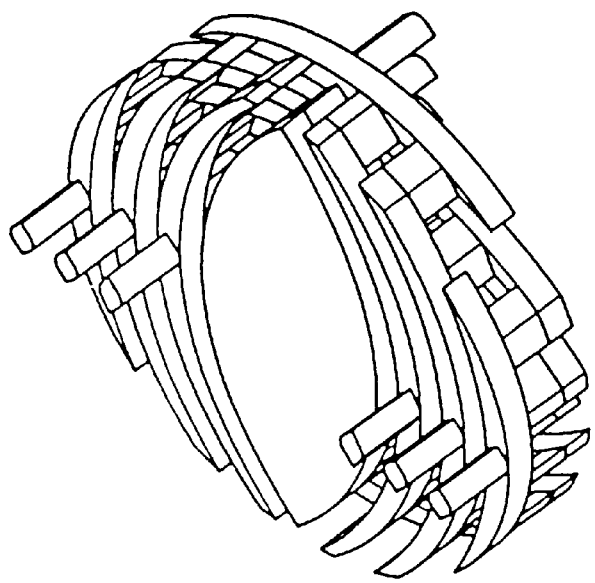
Figure 9D:
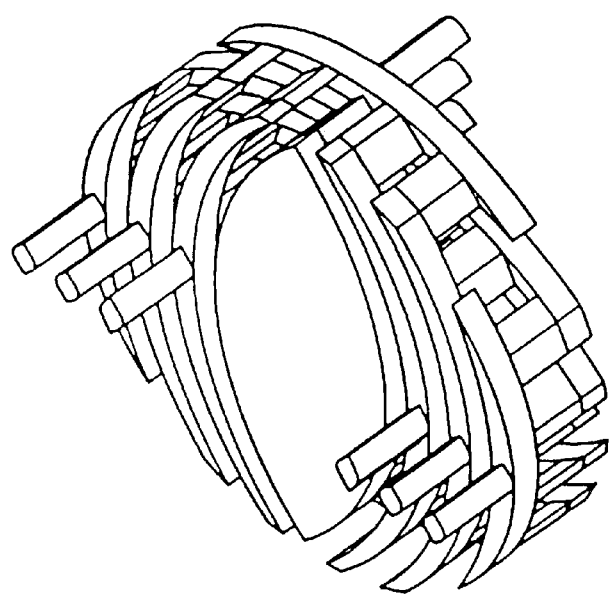

FIGS. 7a and 7b shows a transition plate from a zone with 8 pins on the diameter to a zone with 4 pins on the diameter, in front view (FIG. 7a) and in a perspective view (FIG. 7b).

In another embodiment of the apparatus, the distance between the bars of the mixer elements is changed so that at locations with a high viscosity of the materials of the mix, generally towards the outlet for the materials of the mix, the distance between the bars becomes large.

FIGS. 8a to 8d show, in this sequence, mixer elements with a rising distance between the gaps which are used in this embodiment.

In this embodiment of the apparatus the axial dimension of the mixer elements is changed so that at locations with a high viscosity, generally toward the outlet for the materials of the mix, the axial dimension becomes large. In a particularly preferred embodiment the lengths of the connector elements between the layers of bars is varied.

FIGS. 9a to 9d show, in this sequence, mixer elements with an increasing length of the connector elements 5.

The pins which clean the gaps between the bars may be given different geometric forms.

Figure 10A:
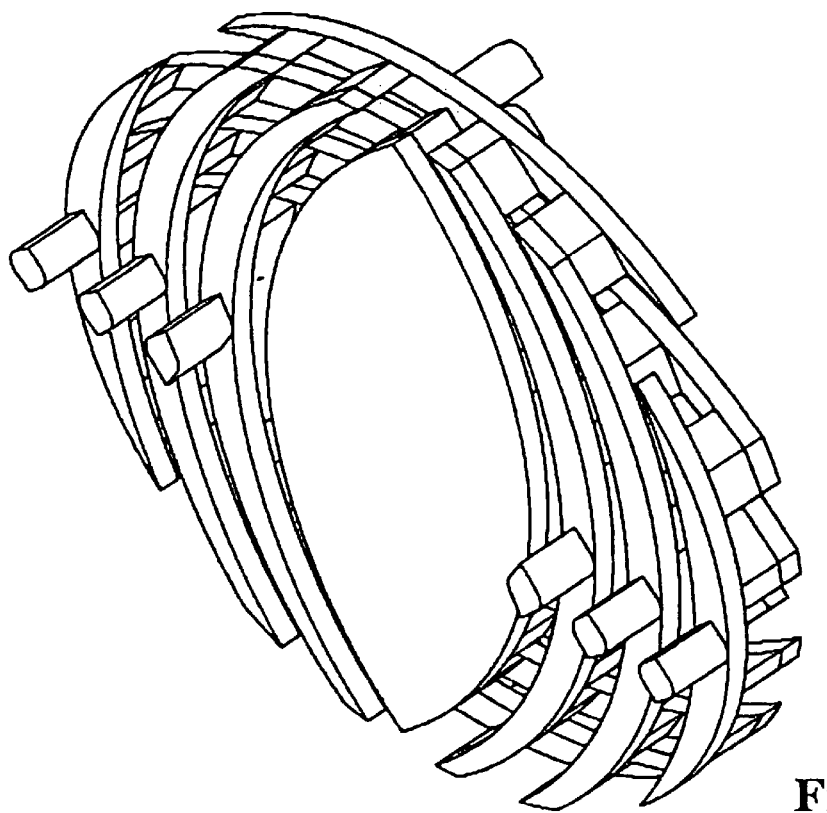
FIGS. 10a–10b show two mixer elements which differ in the cross section of the pins.

In the apparatus of FIG. 10a the bars are cleaned by cylindrical surfaces of the pins.

Figure 10B:
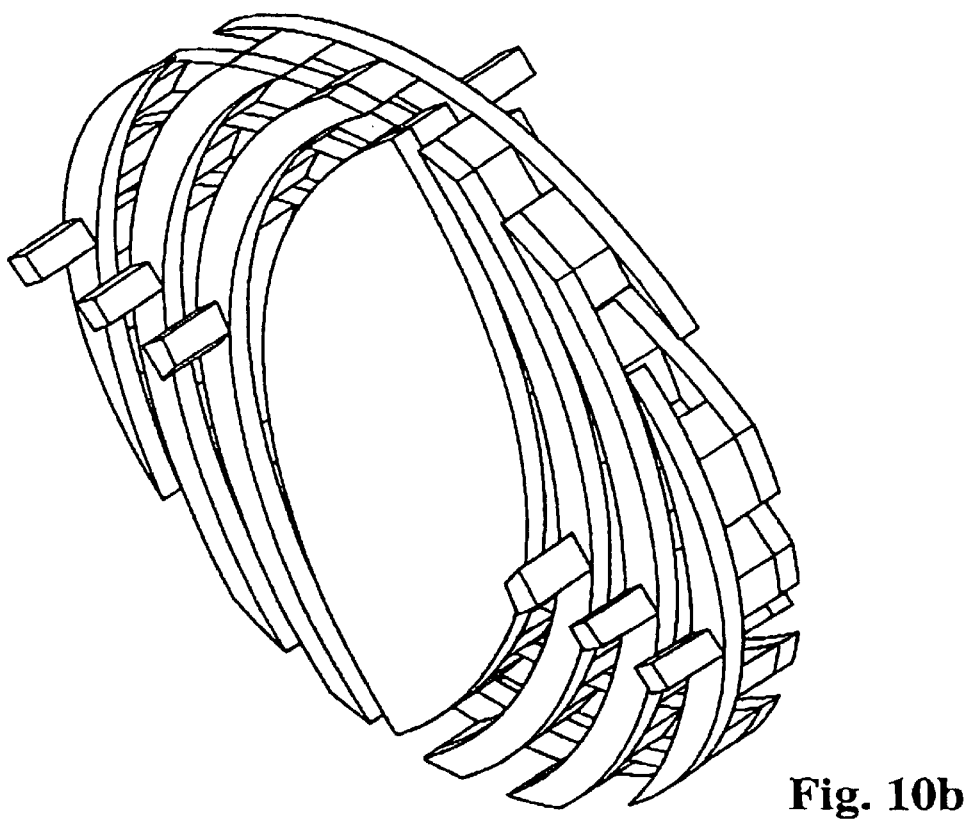

In the apparatus of FIG. 10b the bars are cleaned by edges of the pins. In the second case the ends of the bars are wider and the gaps between the bars are narrower at their ends.

What is claimed is:

1. A mixing apparatus comprising
    a heatable vessel with an inlet for receiving at least one material of a mix,
    an outlet for said at least one material of the mix to exit and
    at least two shafts rotating internally in the vessel, said shafts connected to a drive for corotation of the shafts,
    wherein mixer elements are attached to the shafts, wherein each said mixer elements comprises
        two mixer plates and two layers of spaced bars which are arranged crosswise in relation to each other and are connected to one another,
        and in that at least two pins are attached to face sides of the mixer elements and extending in a parallel direction to a shaft and,
        wherein the pins during the rotation of the shafts clean interstices between the spaced bars of an adjacent mixer element of the respective other shaft or inner spaces between the mixer plate and adjacent bar thereto of an adjacent mixer element of the other shaft.

2. An apparatus according to claim 1, wherein the pins are attached to the face sides of the bars.

3. An apparatus according to claim 1, wherein the connection between crossed layers of bars of a mixer element comprises a layer of connector elements running axially.

4. An apparatus according to claim 1, wherein the shafts with mixer elements have been subdivided into at least two areas in which the mixer elements have a different number of bars.

5. An apparatus according to claim 4, wherein the number of bars of each mixer element is higher in the area of the inlet for the materials of the mix than in the area of the outlet for the materials of the mix.

6. An apparatus according to claim 4, wherein on the shafts, the transition between the areas with mixer elements with a different number of bars is formed by mixer elements which have two layers with a different number of bars, which are arranged crosswise in relation to each other.

7. An apparatus according to claim 1, wherein the shafts with mixer elements have been subdivided into at least two areas in which in the direction of the shaft axis, the mixer elements have interstices of different widths between the bars.

8. An apparatus according to claim 7, wherein the width of the interstices between the bars of each mixer element in the area of the inlet for the materials of the mix is smaller than in the area of the outlet for the materials of the mix.

9. An apparatus according to claim 7, wherein on the shafts, the transition between the areas with mixer elements with a different width of the interstices between the bars is formed by mixer elements which have two layers of bars, which are arranged crosswise in relation to each other, with different width of interstices between the bars.

10. An apparatus according to claim 1, wherein the drive is constructed for equal-speed rotation of adjacent shafts.

11. An apparatus according to claim 1, wherein the dimension of the mixer elements, seen in the direction along the shaft axis, is smaller in the area of the inlet for the materials of the mix than in the area of the outlet for the materials of the mix.

12. An apparatus according to claim 11, wherein connector elements are located between said layers of bars to provide the different axial dimension of the mixer elements, said different axial dimensions are brought about by different axial dimensions of said connector elements.

* * * * *